United States Patent [19]

Powell

[11] Patent Number: 4,541,943

[45] Date of Patent: Sep. 17, 1985

[54] HEAT PUMPS

[75] Inventor: Richard L. Powell, Cheshire, England

[73] Assignee: Imperial Chemical Industries PLC, London, England

[21] Appl. No.: 610,801

[22] Filed: May 16, 1984

[30] Foreign Application Priority Data

May 20, 1983 [GB] United Kingdom ............... 8313958
Jan. 4, 1984 [GB] United Kingdom ............... 8400099
Mar. 7, 1984 [GB] United Kingdom ............... 8406002

[51] Int. Cl.$^4$ .................. F25B 17/02; C09K 5/04
[52] U.S. Cl. ........................... 252/67; 252/69; 260/239 A; 546/184; 548/400; 548/579; 564/510; 568/683; 570/123; 570/134; 570/141
[58] Field of Search ............... 252/67, 69; 260/239 A; 546/184; 548/400, 579; 564/510; 568/683; 570/123, 134, 141

[56] References Cited

U.S. PATENT DOCUMENTS

| | | | |
|---|---|---|---|
| 2,348,321 | 5/1944 | Benning et al. | 564/510 |
| 2,413,696 | 1/1947 | Downing et al. | 570/134 |
| 2,691,043 | 10/1954 | Husted et al. | 564/510 |
| 2,831,033 | 5/1958 | O'Rear | 568/683 |
| 2,972,639 | 2/1961 | Stevens | 570/141 |
| 3,134,816 | 5/1964 | Scott et al. | 564/510 |
| 3,362,180 | 1/1968 | Eiseman, Jr. | 252/67 |
| 3,407,232 | 10/1968 | Mitsch | 252/67 |
| 4,482,465 | 11/1984 | Gray | 252/69 |

OTHER PUBLICATIONS

"Heat Pumps, Design and Applications" by D. A. Reay et al., (1979).

Primary Examiner—Paul Lieberman
Assistant Examiner—Robert A. Wax
Attorney, Agent, or Firm—Cushman, Darby & Cushman

[57] ABSTRACT

A mechanical vapor recompression heat pump system wherein the working fluid is a saturated fluorohydrocarbon or fluorohydrocarbon ether having from 3 to 5 carbon atoms or a fluorinated amine containing up to 6 carbon atoms and having the formula:

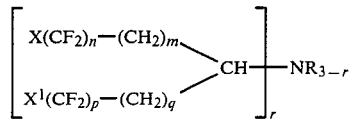

wherein each of
X and X$^1$, independently, represents hydrogen or fluorine,
R represents hydrogen or a lower alkyl radical,
n represents an integer from 1 to 4,
each of m and q represents an integer from 0 to 2,
p represents an integer from 0 to 4 provided that p is not zero when X$^1$ is fluorine, and
r represents an integer from 1 to 3;
or the formula:

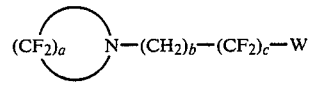

wherein W represents hydrogen or fluorine, a represents an integer from 3 to 5, b represents an integer from 1 to 3 and c represents an integer from 0 to 2 provided that c is not zero when W is fluorine.

4 Claims, No Drawings

HEAT PUMPS

This invention relates to heat pumps of the mechanical vapour recompression type and more particularly to working fluids for use therein.

Heat pumps which transfer heat from a low temperature zone to a higher temperature zone are well known. In the mechanical vapour recompression type, a fluid of suitable boiling point evaporates at low pressure taking heat from the surrounding lower temperature zone. The resulting vapour is then compressed and passed to a condenser where it condenses and gives off heat to the higher temperature zone. The condensate is then returned through an expansion valve to the evaporator, so completing the cycle. The mechanical energy required for compressing the vapour and pumping the fluid is provided by, for example, an electric motor or an internal combustion engine.

The suitability of a material as a heat pump working fluid depends upon a number of factors. Thus, in addition to having a suitable boiling point, it must be generally acceptable in respect of toxicity, flammability and corrosivity.

Materials that have been proposed as heat pump fluids include, in particular, fluorinated hydrocarbons such as trichlorofluoromethane and 1,2,2-trichloro-1,1,2-trifluoroethane. Whilst these fluids have been generally satisfactory for the purpose for which they were intended, they are less suitable for heat pumps operating at high output temperatures because of their instability and corrosivity, especially in the presence of lubricating oils.

The present invention provides a mechanical vapour recompression heat pump system wherein the working fluid is a saturated fluorohydrocarbon or fluorohydrocarbon ether having from 3 to 5 carbon atoms or a fluorinated amine containing up to 6 carbon atoms and having the formula:

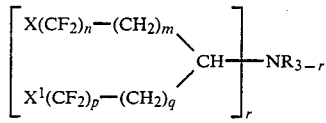

(1)

wherein each of
X and $X^1$, independently, represents hydrogen or fluorine,
R represents hydrogen or a lower alkyl radical,
n represents an integer from 1 to 4,
each of m and q represents an integer from 0 to 2,
p represents an integer from 0 to 4 provided that p is not zero when $X^1$ is fluorine, and
r represents an integer from 1 to 3;
or the formula:

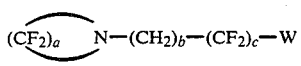

(2)

wherein W represents hydrogen or fluorine, a represents an integer from 3 to 5, b represents an integer from 1 to 3, and c represents an integer from 0 to 2 provided that c is not zero when W is fluorine.

The term "fluorohydrocarbon" as used herein means a compound containing atoms of carbon, hydrogen and fluorine only, whilst "fluorohydrocarbon ether" means an ether containing atoms of carbon, hydrogen, fluorine and oxygen only, both hydrogen and fluorine being present in each case.

For increased stability, the fluorohydrocarbons and fluorohydrocarbon ethers should not contain groups from which hydrogen fluoride is likely to be eliminated during use. Examples of such groups include $-CH_2CH_2F$ and $-CH_2-CHF-CH_2-$. Where low flammability is an important criterion, the hydrogen/fluorine atomic ratio should not exceed unity.

The fluorohydrocarbons and ethers may have acyclic (Linear or branched) or cyclic structures.

Examples of acyclic fluorohydrocarbons which may be used include those having the following structures:

$$H(CF_2)_xH \quad (3)$$

wherein x is 3, 4 or 5, $$H(CF_2)_xCH_2F \quad (4)$$

wherein x is 2 or 3, $$CF_3(CF_2)_xCH_2F \quad (5)$$

wherein x is 1, 2 or 3, $$CF_3CHF(CF_2)_xCH_2F \quad (6)$$

wherein x is 0, 1 or 2, $$CF_3CHF(CF_2)_xCHF_2 \quad (7)$$

wherein x is 0, 1 or 2.

The acyclic fluorohydrocarbons may be obtained by methods that have been fully described in the prior art.

Acyclic fluorohydrocarbon ethers which may be used include fluorinated dialkyl ethers having from 3 to 5 carbon atoms of which an alpha-carbon atom, relative to the oxygen atom, carries at least one fluorine substituent and the adjacent beta-carbon atom carries at least one hydrogen substituent. Ethers of this class may be prepared by the ionic addition of unsaturated fluorinated species to an alcohol. As examples of this class of ether, there may be mentioned 1-methoxy-1,1,2,2-tetrafluoroethane, and 1-(2,2,2-trifluoroethoxy)-1,1,2,2-tetrafluoroethane, and 1-methoxy-1,1,2-trifluoroethane.

Other acyclic hydrocarbon ethers which may be used include compounds of the formula:

$$ROCF_2H \quad (8)$$

wherein R represents a fluorinated $C_{2-4}$ alkyl group. Ethers of this class may be prepared by the addition of difluorocarbene to a fluorinated alcohol. Examples include 1-difluoro-methoxy-2,2,2-trifluoroethane.

Cyclic fluorohydrocarbons which may be used include three- to five-membered ring compounds. In particular, there may be mentioned compounds of the formula:

(9)

wherein at least four of the $R^1$–$R^7$ substituents represent fluorine, the remainder representing hydrogen. Examples of suitable cyclic fluorohydrocarbons include the following:

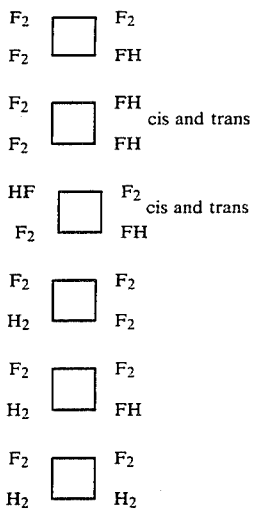

(10)
(11) cis and trans
(12) cis and trans
(13)
(14)
(15)

Cyclic fluorohydrocarbon ethers which may be used include four- and five-membered ring compounds. In particular there may be mentioned fluorinated oxetanes having at least three fluorine substituents, for example 2,2,3,3-tetrafluoro-oxetane.

The cyclic fluorohydrocarbon and ethers, which may be obtained by known methods, may be used singly or in the form of mixtures. Furthermore, if desired, one or more of the fluorohydrocarbons or fluorohydrocarbon ethers may be used in admixture with one or more of the fluorinated amines of Formula I or Formula 2 or with known working fluids.

When the amines of Formula I contain two R substituents on the nitrogen atom, they may be the same or different. Thus, they may both be hydrogen or they may be identical or different lower alkyl radicals or one may be hydrogen and the other lower alkyl. Similarly, when r is 2 or 3, the radicals to which it relates may be identical or different.

One useful class of amines falling within the scope of Formula I is the class represented by the formula:

(X CF$_2$CHQ)$_r$NH$_{3-r}$ wherein x and r have the meanings given above and Q is hydrogen, lower alkyl, difluoromethyl or trifluoromethyl, the amine having a maximum of 6 carbon atoms.

Specific examples of fluorinated amines of Formula I or Formula 2 which may be used include 2,2,2-trifluoroethylamine and 2,2-difluoroethylamine and their N-methyl and N,N-dimethyl derivatives, bis(2,2,2-trifluoroethyl)amine and bis(2,2-difluoroethyl)amine and their N-methyl derivatives, tris(2,2,2-trifluoroethyl)amine, tris(2,2-difluoroethyl)amine, 2,2,2,2',2'-pentafluorodiethylamine, 3,3-difluoro-n-propylamine, 2,2,3,3-tetrafluoro-n-propylamine, 1-difluoromethyl-2,2-difluoroethylamine, 1-trifluoromethyl-2,2,2-trifluoroethylamine, 1-methyl-2,2-difluoroethylamine, N-methyloctafluoropyrrolidine and N-methyl-3,3,4,4-tetrafluoropyrrolidine.

The amines may be used singly or in the form of azeotropic or non-azeotropic mixtures. Such mixtures may be deliberately prepared in order to provide a working fluid having particular properties or they may be the total product of a manufacturing process, for example a process in which a primary amine is formed together with the corresponding secondary and tertiary amines. Suitable mixtures include mixtures of 2,2-difluoroethylamine with bis(2,2-difluoroethyl)amine and tris(2,2-difluoroethyl)amine, mixtures of 2,2,2-trifluoroethylamine with bis(2,2,2-trifluoroethyl)amine and tris(2,2,2-trifluoroethyl)amine, and mixtures of 2,2-difluoroethylamine and 2,2,2-trifluoroethylamine. The fluorinated amines may also be used in admixture with other heat pump fluids.

In general, the fluorinated amines described herein are known compounds which may be prepared by methods fully described in the prior art.

The fluorocompounds described herein have boiling points at atmospheric pressure in the temperature range 15°–120° C. and are especially, though not exclusively, suitable as working fluids in mechanical vapour recompression heat pumps of which the primary purpose is heating of the high temperature zone rather than refrigeration of the low temperature zone, for example pumps having output temperatures in the range 100°–150° C. and maximum working pressures in the range 10–30 bar. The pumps may be of conventional design, for example those operating on a reverse Rankine Cycle.

A valuable indication of the usefulness of the above mentioned compounds as heat pump working fluids may be obtained from pressure/enthalpy diagrams which may be constructed in known manner for any of the compounds given the vapour pressure at various temperatures (determined experimentally), the critical temperature (also determined experimentally) and the ideal gas specific heat (estimated by a group contribution method). From these diagrams it is possible to estimate the coefficient of performance (COP) of a fluid when used in a mechanical vapour recompression heat pump for pumping heat from a source at a specified temperature to a load at a higher temperature, the coefficient of performance being the ratio of quantity of heat extracted to amount of work expanded.

The invention is illustrated but not limited by the following Examples.

EXAMPLES 1

The vapour pressure at various temperatures and the critical temperature were determined for 1-methoxy-1,1,2,2-tetrafluoroethane and the ideal gas specific heat was estimated by a group contribution method. These figures were used for the construction of a pressure-enthalpy diagram from which design parameters were calculated for three typical heat pumps. The results of the calculations are summarised in Table 1.

TABLE 1

| | Condensing Temperature (°C.) | Condensing Pressure (bar) | Temperature of vapor leaving Evaporator (°C.) | Evaporating Pressure (bar) | COP |
|---|---|---|---|---|---|
| 1 | 100 | 6.2 | 46 | 1.3 | 3.47 |
| 2 | 125 | 10.7 | 75 | 2 | 3.64 |
| 3 | 150 | 17.2 | 103 | 6 | 3.80 |

The results demonstrate that 1-methoxy-1,1,2,2-tetrafluoroethane can be used as a working fluid in heat pumps operating at the stated condensing and evaporating temperatures. The minimum evaporating temperature is 37° C. (the boiling point of the compound at atmospheric pressure). The preferred condensing temperature is 167° C. (corresponding to a pressure of 23 bar). Above this value, the latent heat decreases rapidly as the temperature approaches the critical temperature (186° C.) making the fluid less suitable for use above 167° C.

EXAMPLE 2

Using the process outlined in Example 1, a pressure-/enthalpy diagram was constructed for 1-(2,2,2-trifluoroethoxy)-1,1,2,2-tetrafluoroethane. This was used for the calculation of design parameters for two typical heat pumps. The results of the calculations are summarised in Table 2.

TABLE 2

| | Condensing Temperature (°C.) | Condensing Pressure (bar) | Temperature of vapor leaving Evaporator (°C.) | Evaporating Pressure (bar) | COP |
|---|---|---|---|---|---|
| 1 | 150° | 10 | 123° C. | 3.7 | 6.2 |
| 2 | 175° | 16 | 147° C. | 6.5 | 5.9 |

EXAMPLE 3

The vapour pressure at various temperatures and the critical temperature were determined for 2,2,2-trifluoroethylamine and the ideal gas specific heats were estimated by a group contribution method. These figures were used for the construction of a pressure enthalpy diagram and also for calculating design parameters for three typical heat pumps. The results are summarised in Table 3.

TABLE 3

| | Condensing Temperature (°C.) | Condensing Pressure (bar) | Temperature of vapor leaving evaporator (°C.) | Evaporating Pressure (bar) | COP |
|---|---|---|---|---|---|
| 1 | 101 | 6.97 | 50 | 1.68 | 5.82 |
| 2 | 123 | 11.12 | 75 | 3.56 | 6.47 |
| 3 | 148 | 18.16 | 100 | 6.71 | 6.40 |

The results demonstrate that 2,2,2-trifluoroethylamine can be used as a working fluid in heat pumps operating at the stated condensing and evaporating temperatures. The preferred minimum evaporating temperature is 37° C. (the boiling point of the compound at atmospheric pressure). Above 180° C., the latent heat decreases rapidly as the temperature approaches the critical temperature (198° C.) making the fluid less suitable for use above 180° C.

EXAMPLE 4

The techniques described above were applied to 1,1,2,2,3-pentafluoropropane with the following results.

| | Condensing Temperature (°C.) | Condensing Pressure (bar) | Temperature of vapor leaving Evaporator (°C.) | Evaporating Pressure (bar) | COP |
|---|---|---|---|---|---|
| 1 | 140 | 19 | 80 | 3 | 2.94 |
| 2 | 120 | 13 | 60 | 1.7 | 3.05 |

-continued

| | Condensing Temperature (°C.) | Condensing Pressure (bar) | Temperature of vapor leaving Evaporator (°C.) | Evaporating Pressure (bar) | COP |
|---|---|---|---|---|---|
| 3 | 100 | 8.5 | 60 | 2 | 5.10 |

This fluid is therefore useful as a heat pump working fluid at temperatures up to about 140° C. Above this temperature, its latent heat is rapidly decreasing.

EXAMPLE 5

The techniques described above were applied to 2,2,3,3-tetrafluoro-oxetane with the following results.

| | Condensing Temperature (°C.) | Condensing Pressure (bar) | Temperature of vapor leaving Evaporator (°C.) | Evaporating Pressure (bar) | COP |
|---|---|---|---|---|---|
| 1 | 140 | 19 | 80 | 4.0 | 3.67 |
| 2 | 140 | 19 | 100 | 7.2 | 5.89 |
| 3 | 120 | 11.5 | 80 | 4.0 | 6.00 |

This fluid is therefore useful for output temperatures up to about 145° C. Above that temperature, its latent heat is becoming too small.

EXAMPLE 6

The techniques described above were applied to 1,1,2,2-tetrafluorocyclobutane with the following results.

| | Condensing Temperature (°C.) | Condensing Pressure (bar) | Temperature of vapor leaving evaporator (°C.) | Evaporating Pressure (bar) | COP |
|---|---|---|---|---|---|
| 1 | 153 | 13 | 90 | 1.5 | 2.96 |
| 2 | 120 | 6.8 | 80 | 1.5 | 5.37 |
| 3 | 153 | 13 | 120 | 4.7 | 6.15 |

This fluid is useful for condensing temperatures up to about 180° C.

EXAMPLE 7

The techniques described above were applied to 1,1,1,2,3,3,4-heptafluoro-n-butane with the following results.

| | Condensing Temperature (°C.) | Condensing Pressure (bar) | Temperature of vapor leaving evaporator (°C.) | Evaporating Pressure (bar) | COP |
|---|---|---|---|---|---|
| 1 | 134 | 10.2 | 100 | 2.5 | 4.7 |
| 2 | 112 | 6.9 | 89 | 2.5 | 7.27 |
| 3 | 134 | 10.2 | 80 | 1.4 | 2.5 |

This fluid is suitable for temperatures up to about 140° C.

I claim:

1. A mechanical vapour recompression heat pump having an output temperature above 100° C. wherein the working fluid is selected from the group consisting of 1-methoxy-1,1,2,2-tetrafluoroethane, 1,1,2,2,3-pentafluoropropane and amines of the formula:

$(XCF_2CHQ)_rNH_{3-r}$ wherein X represents hydrogen or fluorine, Q represents hydrogen, lower alkyl, difluoromethyl or trifluoromethyl and r is an integer from 1 to 3.

2. A mechanical vapour recompression heat pump wherein the working fluid is a fluorinated amine containing up to 6 carbon atoms and having the formula:

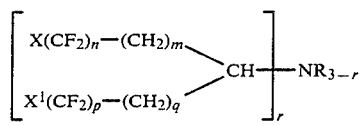

wherein each of
X and $X^1$, independently, represents hydrogen or fluorine,
R represents hydrogen or a lower alkyl radical,
n represents an integer from 1 to 4
each of m and q represents an integer from 0 to 2
p represents an integer from 0 to 4 provided that p is not zero when $X^1$ is fluorine, and
r represents an integer from 1 to 3;
or the formula:

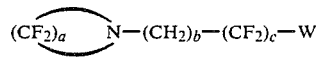

wherein W represents hydrogen or fluorine, a represents an integer from 3 to 5, b represents an integer from 1 to 3 and c represents an integer from 0 to 2 provided that c is not zero when W is fluorine.

3. A mechanical vapour recompression heat pump according to claim 2 wherein the working fluid is an amine of the formula:

$(XCF_2CHQ)_rNH_{3-r}$ wherein X and r have the meanings given in claim 2 and Q is hydrogen, lower alkyl, difluoromethyl or trifluoromethyl.

4. A mechanical vapour recompression heat pump according to claim 3 wherein the working fluid is 2,2,2-trifluoroethylamine.

* * * * *